INVENTOR.
CHRISTO P. ATHANAS
BY
ATTORNEY.

INVENTOR.
CHRISTO P. ATHANAS
ATTORNEY.

United States Patent Office 3,440,887
Patented Apr. 29, 1969

3,440,887
APPARATUS FOR MEASURING ROUNDNESS CHARACTERISTICS
Christo P. Athanas, Southbridge, Mass., assignor to Slica Corporation, a corporation of Massachusetts
Filed Aug. 5, 1965, Ser. No. 477,449
Int. Cl. G01l 19/14
U.S. Cl. 73—432                                  8 Claims

ABSTRACT OF THE DISCLOSURE

An apparatus for measuring roundness characteristics comprising a housing having a shaft bore therein, a shaft in said bore, lower and upper thrust plates connected to the shaft, upper and lower manifold rings each in separate sealed relation with the sides of said housing, an air or gas inlet in one of said manifold rings, two spaced series of separate reservoirs in said housing surrounding the upper and lower parts of the shaft and in radial relation therewith and with said upper and lower thrust plates and communication with said air or gas inlet, separate passageways in said housing connecting each of the respective reservoirs of the two series and said shaft bore and said upper and lower thrust plates, air or gas escape passage means in said housing and communication with said bore, a table top operatively associated with said shaft and spaced means for adjusting said table top relative to said shaft.

---

This invention relates to new and useful improvements in apparatus for measuring roundness characteristics or the like and has particular reference to an apparatus of this type which is capable of precision accuracy and long life without wear or tear.

An object of the invention is to provide a new and improved apparatus for measuring roundness characteristics which is relatively simple and economical in construction, yet precise and efficient in operation.

Another object is to provide a device of the type set forth which is of the precision type and is capable of trouble free operation for long periods of time.

Another object is to provide a new and improved air or gaseous bearing arrangement for apparatus for measuring roundness characteristics or the like.

Another object is to provide a new and improved air or gas supply arrangement for air or gaseous bearings which provides accurate control of the supply of the air or gas to all of the bearings.

Other objects and advantages of the invention will be apparent from the following description taken in connection with the accompanying drawings in which the preferred form of the invention has been shown by way of illustration only.

Referring to the drawings.

Figure 1:
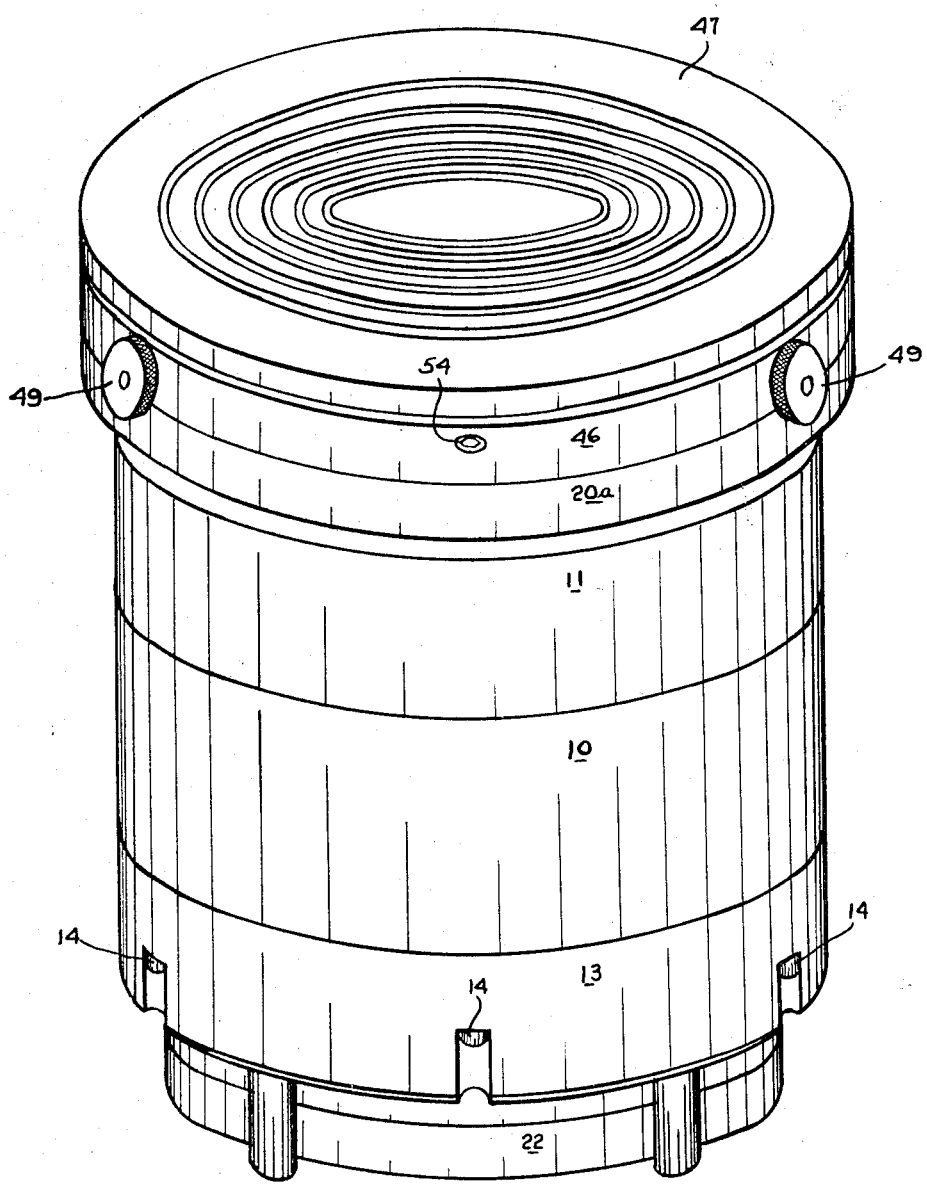
FIG. 1 is a perspective view of a roundness testing and measuring apparatus embodying the invention.
Figure 2:
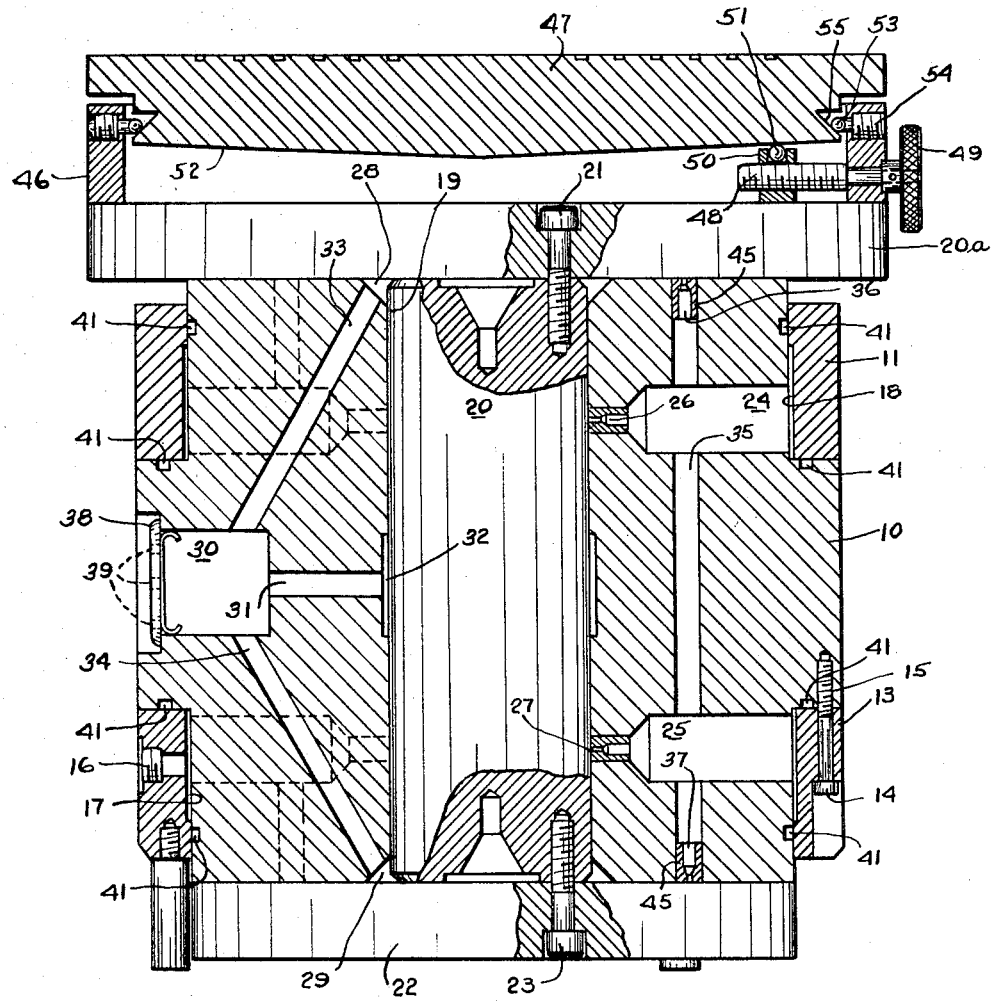
FIG. 2 is a side view partially in section, of the apparatus of FIG. 1.
Figure 3:
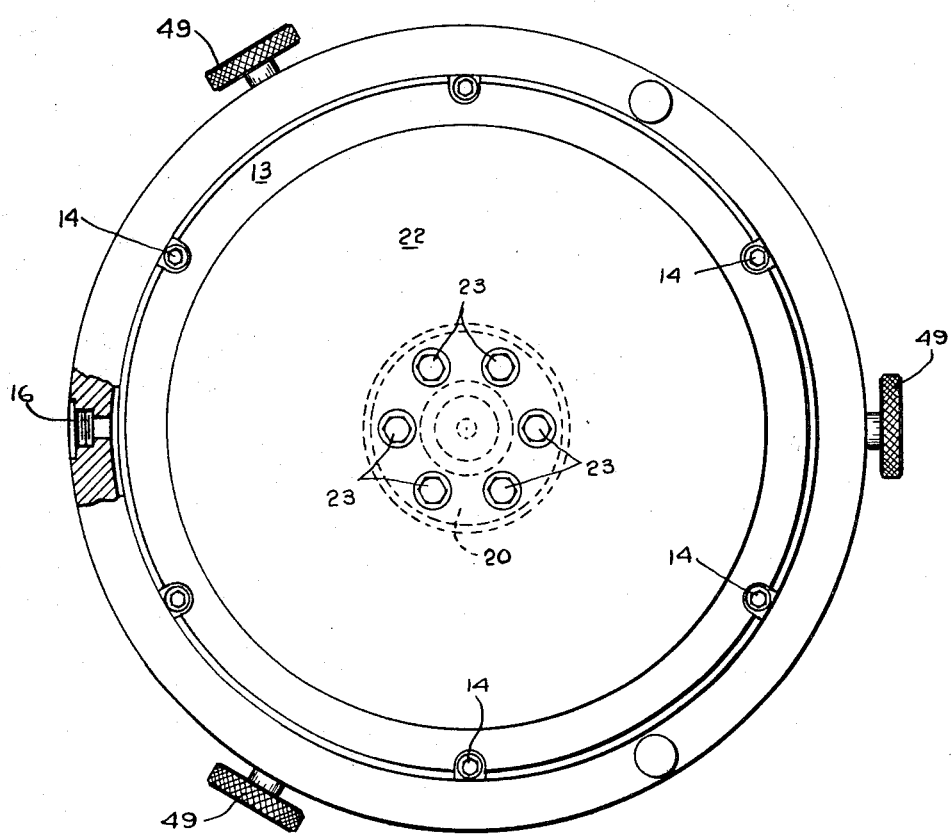
FIG. 3 is a bottom view, partially in section of the apparatus of FIGS. 1 and 2.
Figure 4:
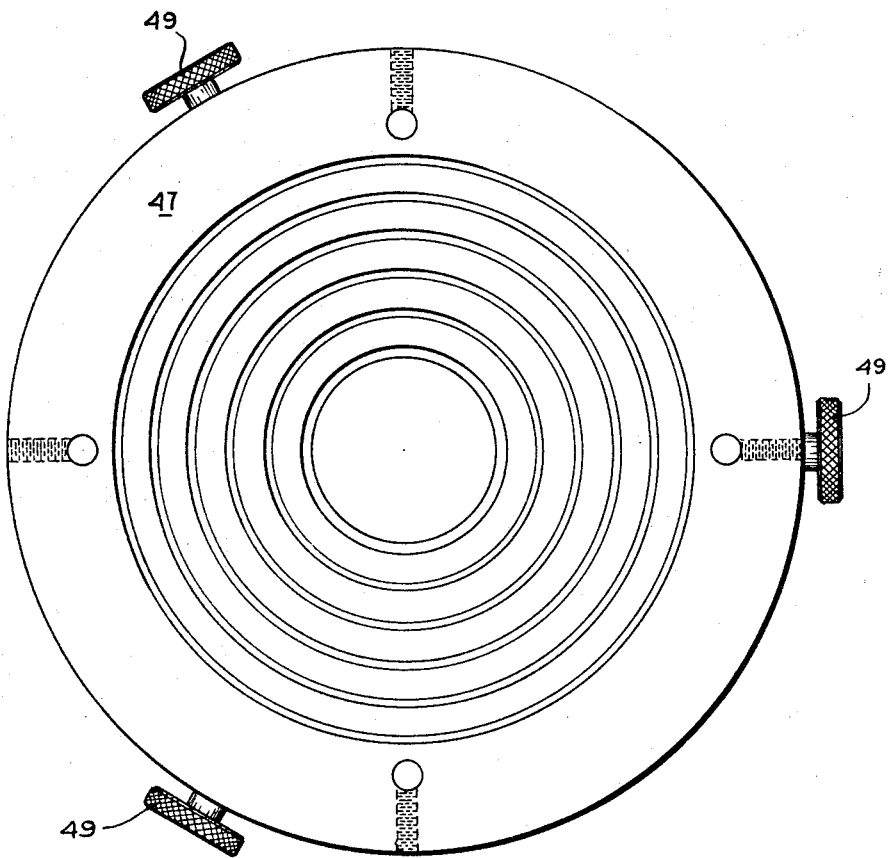
FIG. 4 is a top or plan view thereof.
Figure 5:
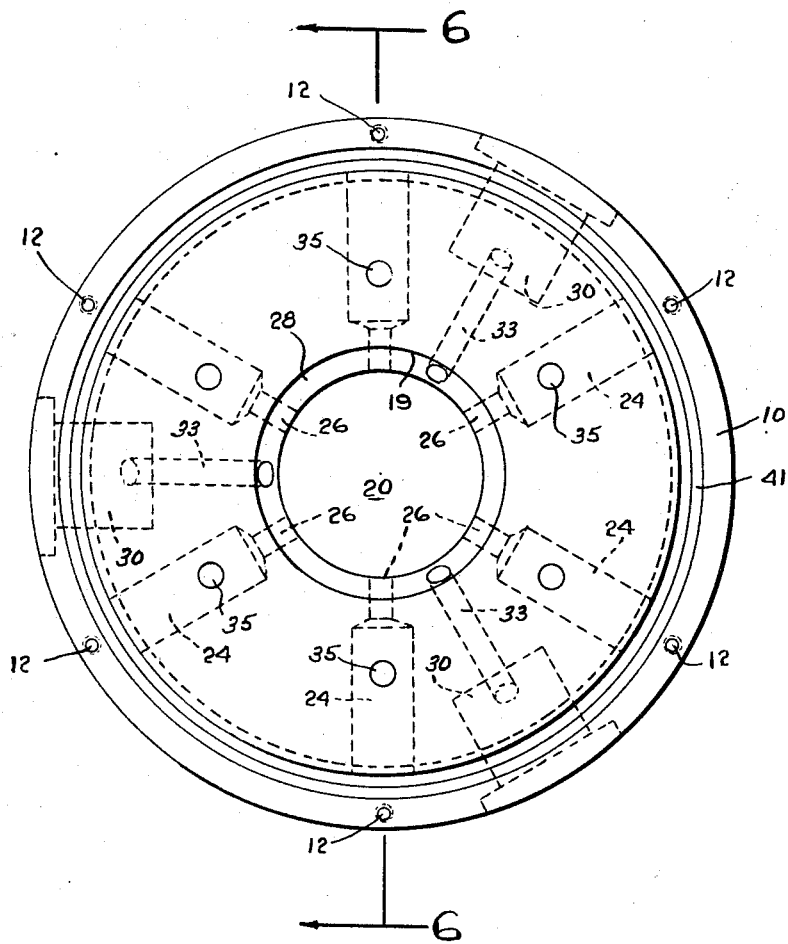
FIG. 5 is a top view with the table top and top thrust plate removed.
Figure 6:
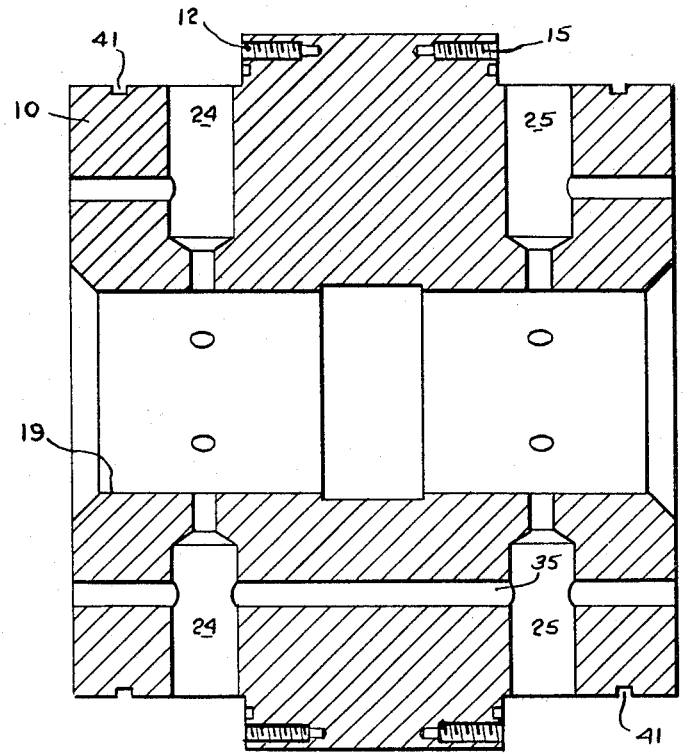
FIG. 6 is a sectional view taken on line 6—6 of FIG. 5, looking in the direction of the arrows.

Referring more particularly to the drawings wherein similar reference characters designate corresponding parts throughout, the apparatus shown embodying the invention comprises the housing 10 having the upper manifold ring 11 positioned thereon and held in position by a series of spaced screws or bolts threaded into threaded openings 12 in body 10, and lower manifold ring 13 secured to body 10 by a series of spaced screws or bolts 14 threaded into threaded openings 15 in body 10 whereby said manifold rings are held in operative position on body 10.

Lower manifold ring 13 is provided with inlet opening 16 for the air or other gas to be supplied to the apparatus and lower manifold ring 13 is provided with annular air passage 17 between said manifold ring and the body and upper manifold ring 11 is provided with annular air passage 18 between upper manifold ring 11 and the body 10.

The air inlet opening 16 could be through upper manifold ring 11, if desired, instead of through lower manifold ring 13.

Housing 10 is provided with longitudinal bore 19 in which is positioned shaft 20 to the upper end of which is connected upper thrust plate 20a by a series of bolts 21 and the lower end of shaft 20 is connected to lower thrust plate 22 by bolts 23.

Surrounding bore 19 are positioned two series of spaced reservoirs which are radially relative to bore 19 and to upper manifold ring 11 and lower manifold ring 13 respectively.

The upper series of reservoirs are each numbered 24 while the lower series of reservoirs are each numbered 25.

Each of the upper reservoirs 24 communicate at their outer ends with annular air passage 18 and these reservoirs communicate through restricted passageways 26 with shaft bore 19.

Each of the lower reservoirs 25 has its outer end communicating with annular air passage 17 and these reservoirs 25 communicate through restricted passageways 27 with shaft bore 19.

The shaft bore 19 is provided with the cut-back or inclined surfaces 28 and 29 adjacent its upper and lower ends respectively. I have found that a 45 degree cut-back or bevel is satisfactory.

While each of the series of reservoirs has been shown as composed of six reservoirs, other desired numbers could be employed.

Equally spaced about the periphery of housing 10 are provided the exhaust or air recesses or exit openings 30. The number of these recesses or exit openings 30 could be other than three. Each of these recesses or exit openings 30 communicates by a passage 31 with annular peripheral groove 32 surrounding the center of shaft 20 and by passageway 33 with upper cut-back surfaces 28 whereby it communicates with upper thrust plate 20a and by passageway 34 communicates with lower cut-back surface 29 whereby it communicates with lower thrust plate 22.

Over each of the exit recesses 30 is positioned a removable disc 38 each of which has a series of perforations 39 and which discs prevent entrance of dust and are removable for cleaning the recess.

The grooves 41 are provided for O-rings, not shown.

The number of reservoirs in each series is similar and each reservoir of one series is connected by a passageway 35 with its corresponding reservoir in the other series. Likewise, each reservoir 24 of the upper series is connected by a restricted passageway 36 with upper thrust plate 20 and each reservoir 25 of the lower series is connected by a restricted passageway 37 with the lower thrust plate 22.

Figure 7:
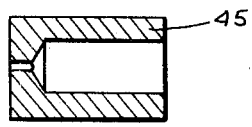
FIG. 7 is a sectional view through one of the metering or control jets for the air or other gas system.

The restricted passages 26, 27, 36 and 37 must be accurate and of similar cross section to accurately control the supply of air or gas to the bearings whereby the air supplied by all restricted passageways is the same. While these restricted passageways could be formed integral with the body or housing 10, I have found that it is more practical, simpler and more economical to form separate jets or restriction members 45, as shown in detail in FIG. 7, and position one of these jet or restriction members in the air passage at each spot where an accurate restriction is required.

On the upper surface of upper thrust bearing 20 is provided support ring 46 for supporting table top 47 and support ring 46 supports the leveling or tilting means for adjusting the angle of table top 47. This adjusting mechanism comprises the spaced screw members 48 adapted to be turned by thumb screws 49.

On each of screws 48 is positioned a nut 50 carrying a steel ball 51 staked in place and adapted to engage the inclined lower surface 52 of table top 47 whereby upon turning of thumb screws 49, nut 50 will be adjusted to adjust the level or angular relation or tilt of the table top 47.

In the periphery of table top 47 intermediate the screws 48 are provided the ball plungers 53 carried by set screws 54 and which ball plungers 53 ride on inclined surfaces 55 on table top 47.

In operation, air or other gas enters through inlet opening 16 from which it circles through manifold 17 into the reservoirs 25 from which it passes through passageways 35 to reservoirs 24.

From the reservoirs, it passes through the various restricted passageways to upper and lower thrusts and to bore 19 for shaft 20 from which it passes through passages 33 and 34 to outlet recesses 30 and through perforations 39 in closure members 38 is exhausted outwardly.

This arrangement provides a construction that is extremely accurate and which maintains its accuracy for long durations, such as for years, without wear and tear. Also, the arrangement of this invention is relatively simple and economical in construction, yet efficient in operation.

From the foregoing, it will be seen that I have provided new and improved means for obtaining all of the objects and advantages of the invention.

I claim:

1. In a device of the character described, a housing, a shaft bore in said housing, a shaft in said shaft bore, lower and upper thrust plates connected to said shaft, upper and lower manifold rings, an air inlet, a series of reservoirs surrounding said shaft and radially disposed relatively thereto and to upper and lower thrusts and communicating with said air inlet, restricted passageways connecting each of said reservoirs and said shaft bore and said upper and lower thrust plates and air escape passage means in said housing and communicating with said shaft bore, a table top operatively associated with said shaft, and spaced means for adjusting the level of said table top.

2. In a device of the character described, a housing having a shaft bore, a shaft in said shaft bore, lower and upper thrust plates connected to the upper and lower ends of said shaft respectively, upper and lower manifold rings surrounding said housing and secured thereto, an air inlet in one of said manifold rings, an upper series and a lower series of spaced air reservoirs radially disposed relative to said shaft bore and said upper and lower manifold rings respectively, restricted air passageways connecting one of said air reservoirs of said upper series with one of said reservoirs of said lower series and with said upper and lower thrust plates, spaced air outlet means in said housing, each of said air outlets communicating with said upper and lower thrusts, and shield means for preventing dust from entering said air outlets.

3. In a device of the character described, a housing having a shaft bore, a shaft in said shaft bore, lower and upper thrust plates connected to the upper and lower ends of said shaft respectively, upper and lower manifold rings surrounding said housing and secured thereto, an air inlet in one of said manifold rings, an upper series and a lower series of spaced air reservoirs radially disposed relative to said shaft bore and said upper and lower manifold rings respectively, restricted air passageways connecting one of said air reservoirs of said upper series with one of said reservoirs of said lower series and with said upper and lower thrust plates, spaced air outlet means in said housing, each of said air outlets communicating with said upper and lower thrusts, and shield means for preventing dust from entering said air outlets, said restricted passageways being of substantially equal cross section.

4. In a device of the character described, a housing having a shaft bore, a shaft in said shaft bore, lower and upper thrust plates connected to the upper and lower ends of said shaft respectively, upper and lower manifold rings surrounding said housing and secured thereto, an air inlet in one of said manifold rings, an upper series and a lower series of spaced air reservoirs radially disposed relative to said shaft bore and said upper and lower manifold rings respectively, restricted air passageways connecting one of said air reservoirs of said upper series with one of said reservoirs of said lower series and with said upper and lower thrust plates, spaced air outlet means in said housing, each of said air outlets communicating with said upper and lower thrusts, and shield means for preventing dust from entering said air outlets, said restricted passageways each being formed of a separate orifice member with all of said members having air passageways of substantially equal cross section.

5. In a device of the character described, an upper thrust plate, a support ring supported by said upper thrust plate, a table top carried by said support ring, a plurality of spaced adjustable centering screws operatively associated with said table top, said table top being adapted to be centered by adjustment of said adjustable centering screws, said table top having a lower cam surface thereon, and a plurality of spaced adjustable leveling means, each of said leveling means being adjustable relative to said cam surface.

6. In a device of the character described, an upper thrust plate, a support ring supported by said upper thrust plate, a table top carried by said support ring, a plurality of spaced adjustable centering screws operatively associated with said table top, said table top being adapted to be centered by adjustment of said adjustable centering screws, said table top having a lower cam surface thereon, and a plurality of spaced leveling means, said leveling means being adjustable relative to said cam surface and adjusting means for adjusting said leveling means relative to said cam surface.

7. In a device of the character described, a housing, a shaft bore in said housing, a shaft in said shaft bore, lower and upper thrust plates connected to said shaft, upper and lower manifold rings each in separate sealed relation with the upper and lower sides of said housing, a gaseous substance inlet, two space separate series of reservoirs in said housing surrounding the upper and lower parts of the shaft and radially disposed relative thereto and to the upper and lower thrust plates and communicating with said gaseous substance inlet, separate passageways in said housing connecting each of the respective reservoirs of the two series and said shaft bore and said upper and lower thrust plates and gaseous substance escape passage means in said housing and communicating with said shaft bore.

8. In a device of the character described, a shaft rotatably supported in the bore of a housing, an upper thrust plate carried by said shaft, a support ring supported by said thrust plate, a table top carried by said support ring, means associated with the table top for centering and retaining said table top relative to the shaft, said table top having a lower cam surface thereon, and a plurality of spaced adjustable leveling means, each of said leveling means being adjustable relative to said cam surface.

References Cited

UNITED STATES PATENTS

| | | | |
|---|---|---|---|
| 1,463,406 | 7/1923 | Serrell et al. | |
| 2,660,484 | 11/1953 | Gerrard et al. | 308—9 |
| 3,013,845 | 12/1961 | Loch | 308—9 |
| 3,058,226 | 10/1962 | Michael. | |
| 3,205,697 | 9/1965 | Parsons et al. | 73—1 |

S. CLEMENT SWISHER, *Primary Examiner.*

U.S. Cl. X.R.

33—174; 308—9